United States Patent
Yang et al.

(10) Patent No.: US 8,224,404 B2
(45) Date of Patent: Jul. 17, 2012

(54) ACCESSORY STRAP SECURING MECHANISM

(75) Inventors: Mu-Wen Yang, Taipei (TW); Chih-Chiang Chang, Taipei (TW)

(73) Assignee: FIH ( Hong Kong) Limited, Kowloon (HK)

( * ) Notice: Subject to any disclaimer, the term of this patent is extended or adjusted under 35 U.S.C. 154(b) by 332 days.

(21) Appl. No.: 12/634,794

(22) Filed: Dec. 10, 2009

(65) Prior Publication Data

US 2010/0304797 A1    Dec. 2, 2010

(30) Foreign Application Priority Data

May 27, 2009    (CN) .......................... 2009 1 0302678

(51) Int. Cl.
*H04M 1/00*    (2006.01)
*H04B 1/38*    (2006.01)
(52) U.S. Cl. .................. 455/575.1; 455/575.6; 455/90.3
(58) Field of Classification Search ............... 455/575.1, 455/575.6, 90.3; 224/191
See application file for complete search history.

(56) References Cited

U.S. PATENT DOCUMENTS

| | | | | |
|---|---|---|---|---|
| 7,929,297 | B2* | 4/2011 | Chen ........................ | 361/679.56 |
| 2007/0108241 | A1* | 5/2007 | Bass et al. ..................... | 224/162 |
| 2008/0153543 | A1* | 6/2008 | Newman et al. ........... | 455/556.1 |
| 2008/0219657 | A1* | 9/2008 | Suzuki et al. ................ | 396/423 |
| 2010/0035666 | A1* | 2/2010 | Chang et al. ............... | 455/575.1 |
| 2010/0118476 | A1* | 5/2010 | Li ............................ | 361/679.01 |

* cited by examiner

*Primary Examiner* — Sonny Trinh
(74) *Attorney, Agent, or Firm* — Altis Law Group, Inc.

(57) ABSTRACT

An accessory strap securing mechanism positioned on a portable electronic device to assemble an accessory strap thereon, the accessory strap securing mechanism includes an assembling portion and a securing member. The assembling portion is formed in the portable electronic device. The securing member includes a holding portion. The holding portion is received in the assembling portion. The holding portion includes a hook and a projection. The securing member is rotatable to allow the accessory strap to be coiled around the holding portion and a distal end of the accessory strap attached to the projection.

14 Claims, 6 Drawing Sheets

ACCESSORY STRAP SECURING MECHANISM

BACKGROUND

1. Technical Field

The present disclosure relates to an accessory strap securing mechanism for a portable electronic device.

2. Description of Related Art

Conventional portable electronic devices usually have an accessory strap securing mechanism for attachment of an accessory strap. However, the small size of existing accessory strap securing mechanisms make it difficult for the strap to be connected to the portable electronic device.

Therefore, there is room for improvement within the art.

BRIEF DESCRIPTION OF THE DRAWING

Many aspects of the present accessory strap securing mechanism for an electronic device can be better understood with reference to the following drawings. The components in the various drawings are not necessarily drawn to scale, the emphasis instead being placed upon clearly illustrating the principles of the present accessory strap securing mechanism in electronic device. Moreover, in the drawings, like reference numerals designate corresponding parts throughout the diagrams.

DETAILED DESCRIPTION

Figure 1:
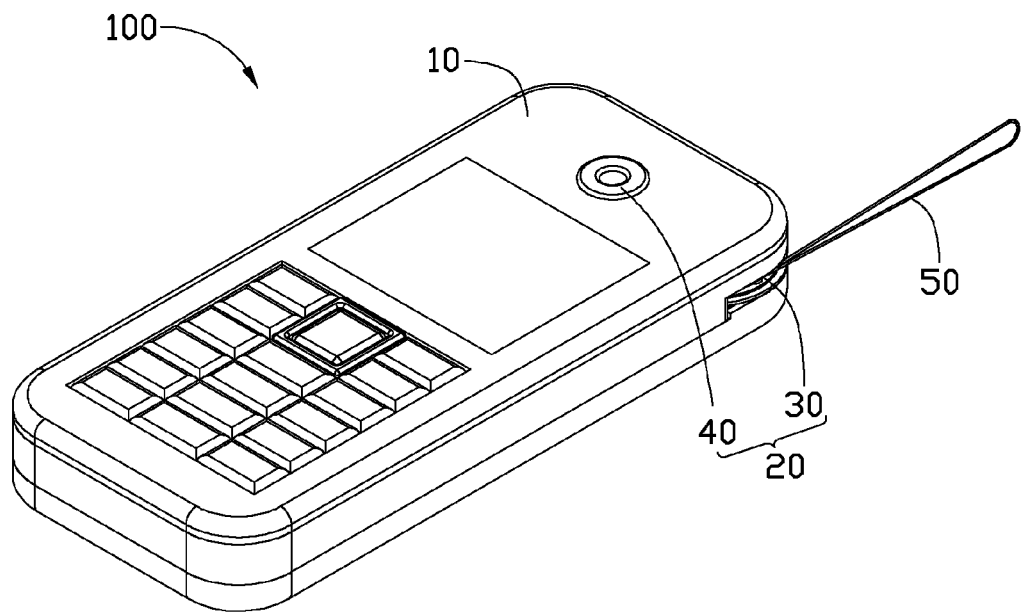
FIG. 1 shows an isometric view of a portable electronic device having an accessory strap assembled therewith in accordance with an exemplary embodiment.

Referring to FIG. 1, a portable electronic device 100 includes a main body 10 disposed with an accessory strap securing mechanism 20 to assemble an accessory strap 50. The main body 10 may be a mobile phone, an MP3, a digital camera or a personal digital assistant (PDA), etc. The accessory strap securing mechanism 20 includes a securing member 30 and a positioning member 40.

Figure 2:
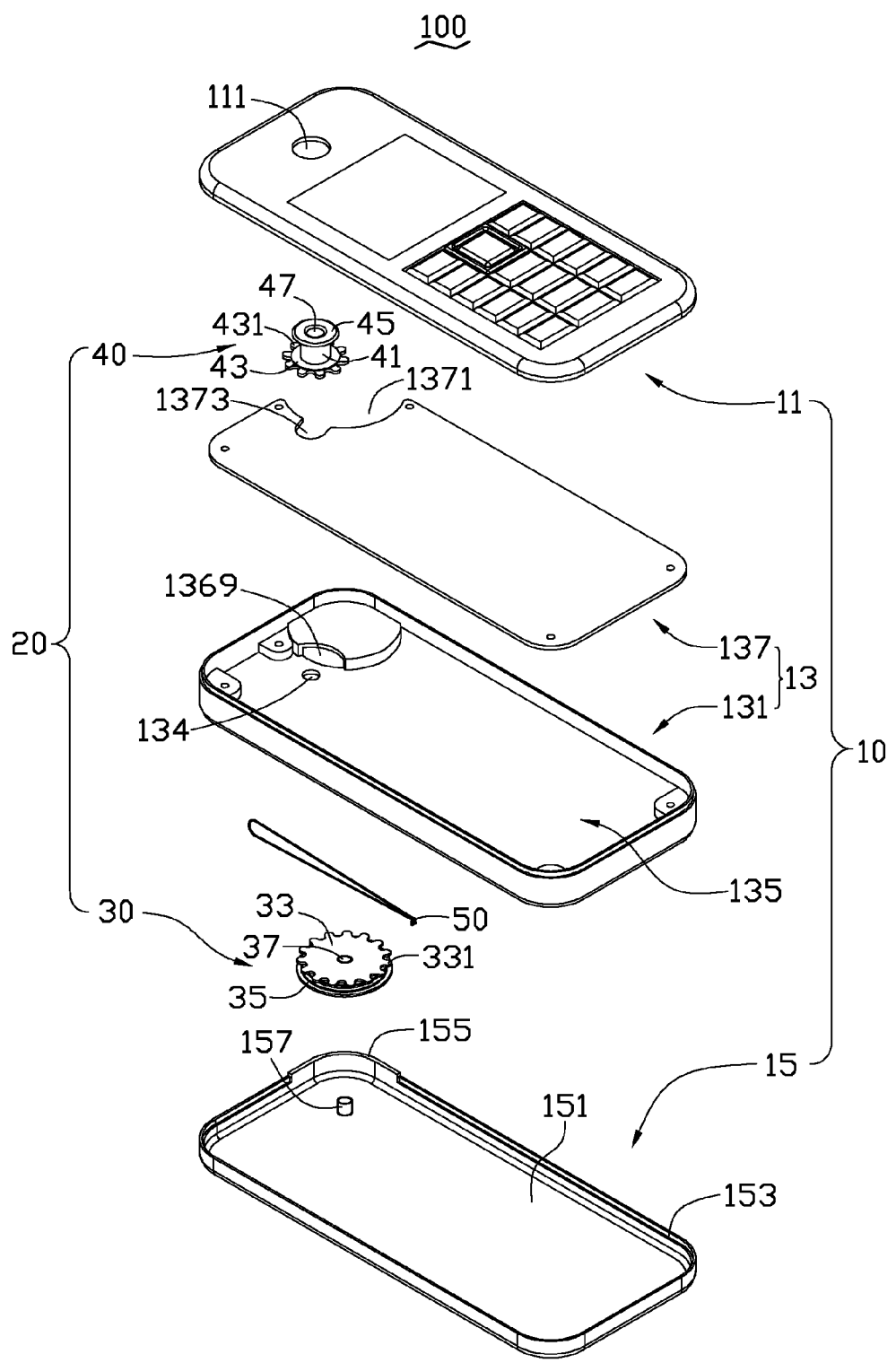
FIG. 2 is an exploded, isometric view of a portable electronic device shown in FIG. 1.
Figure 3:
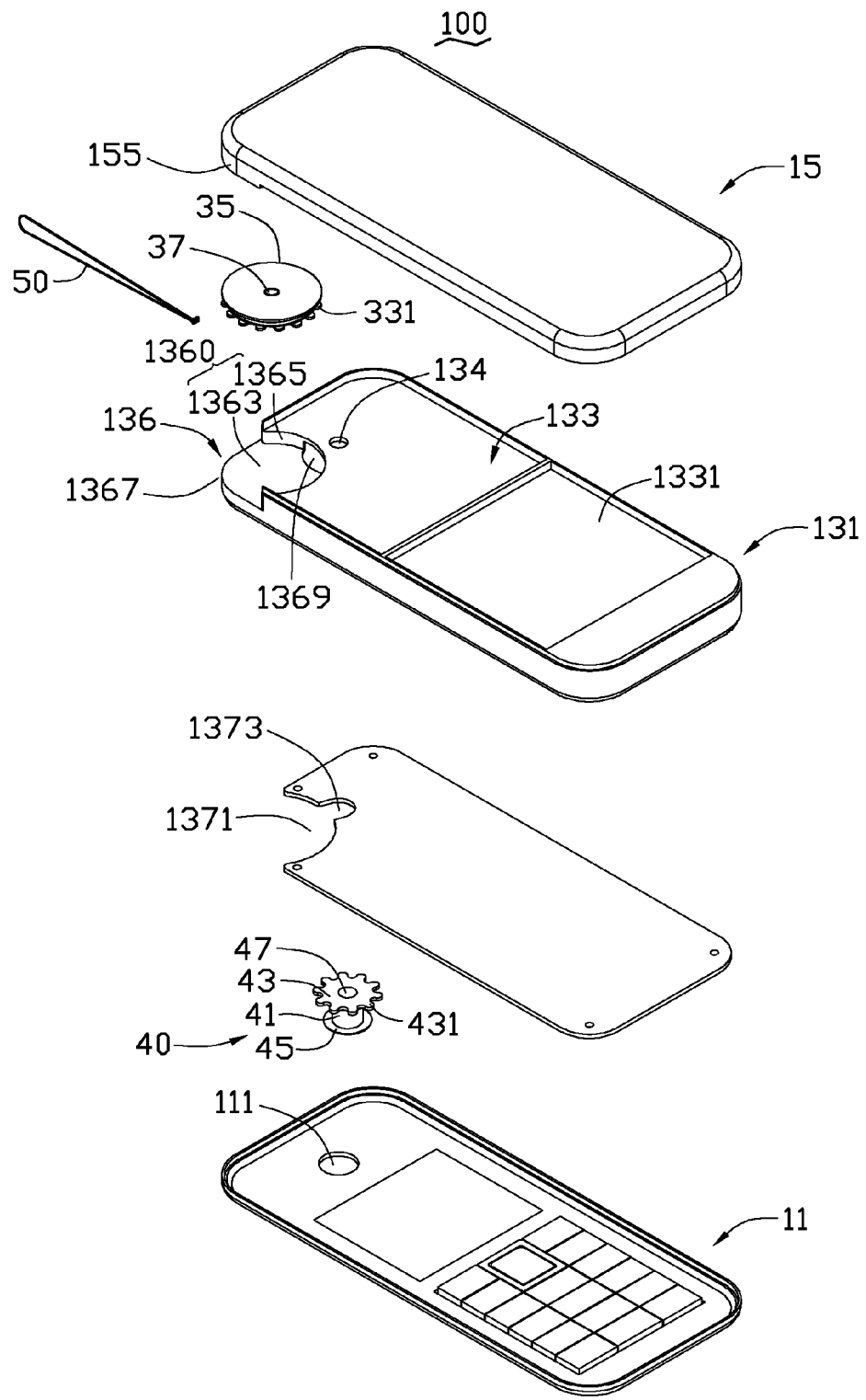
FIG. 3 is similar to FIG. 2, but from another aspect.

Referring to FIGS. 2 and 3, the main body 10 includes a front cover 11, a housing combination 13, and a rear cover 15. The front cover 11 defines an assembling hole 111 for receiving a portion of the positioning member 40. The rear cover 15 includes a flat panel 151 and a peripheral wall 153. A flange 155 extends from one corner of the peripheral wall 153. The planar wall 151 forms a post 157 adjacent to the flange 155. The securing member 30 may be rotatably sleeved on the post 157.

The housing combination 13 includes a housing 131 and a printed circuit board 137 assembled in the housing 131. The housing 131 includes a first surface 133 and an opposite second surface 135. The first surface 133 defines a recess forming a battery receiving cavity 1331. The first surface 133 forms an assembling portion 136 and defines a connected hole 134 at one end of the housing 131. The assembling portion 136 includes a groove 1360 defined by a bottom surface 1363 and a side surface 1365. The side surface 1365 partially surrounds the groove 1360, thereby defining a notch 1367 in the corner of the housing 131. The notch 1367 provides an opening space. A cutout 1369 is defined in an intersection position between the bottom surface 1363 and the side surface 1365. The connected hole 134 is connected to an internal speaker (not shown) of the device that allows sound from the speaker to travel out. The printed circuit board 137 defines an opening 1371 and a slot 1373. The opening 1371 is formed at one corner corresponding to the assembling portion 136. The slot 1373 communicates with the opening 1371 for latching the positioning member 40.

Figure 4:
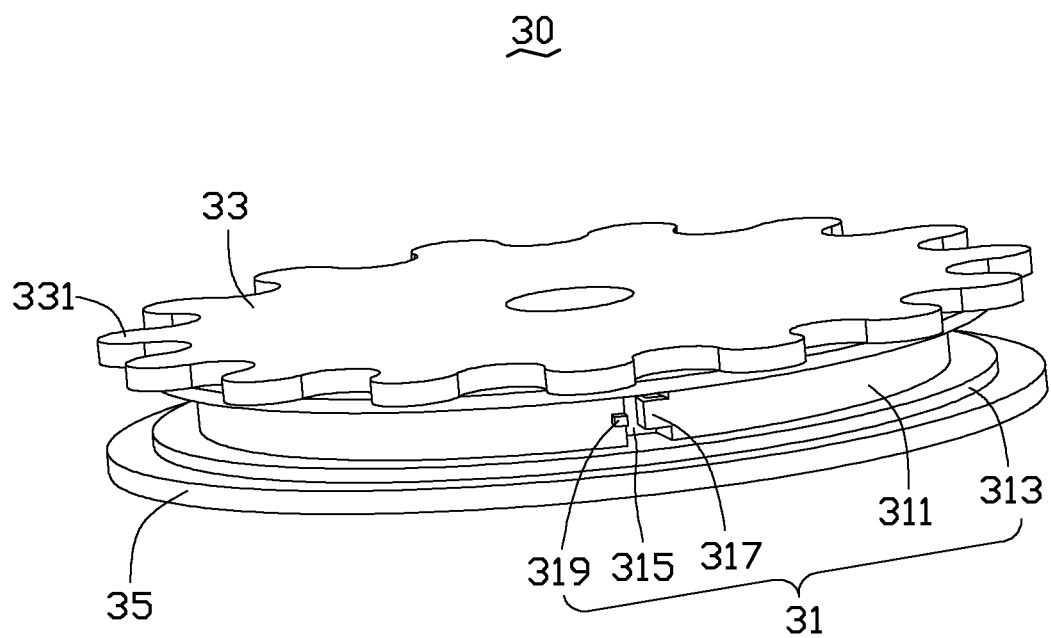
FIG. 4 is an enlarged view of the securing member.

Referring to FIG. 4, the securing member 30 is substantially disk-shaped, and includes a first gear 33, a holding portion 31, and a base portion 35. Each side of the holding portion 31 forms an extended plate 313 to be fixed with the first gear 33 and the base portion 35. The holding portion 31 is substantially cylindrical, and includes a cylindrical surface 311. The cylindrical surface 311 defines a gap 315. A hook 317 and a projection 319 are correspondingly formed at two sides of the gap 315. A distal end of the hook 317 extends into the gap 315. The first gear 33 forms a plurality of teeth 331. A through hole 37 is axially defined in a center area of the securing member 30.

The positioning member 40 includes a column portion 41, a second gear 43 and a latching portion 45. The column portion 41 may be fixedly received in the slot 1373. The second gear 43 and the latching portion 45 are formed at two ends of the column portion 41. The second gear 43 forms a plurality of teeth 431 to allow meshing together of the first gear and the second gear. The latching portion 45 is engagable in the assembling hole 111 of the front cover 11. A central hole 47 is defined in the positioning member 40. When the positioning member 40 is assembled in the housing 131, the central hole 47 is aligned with the connected hole 134 to allow sound from the speaker to travel out.

Figure 5:
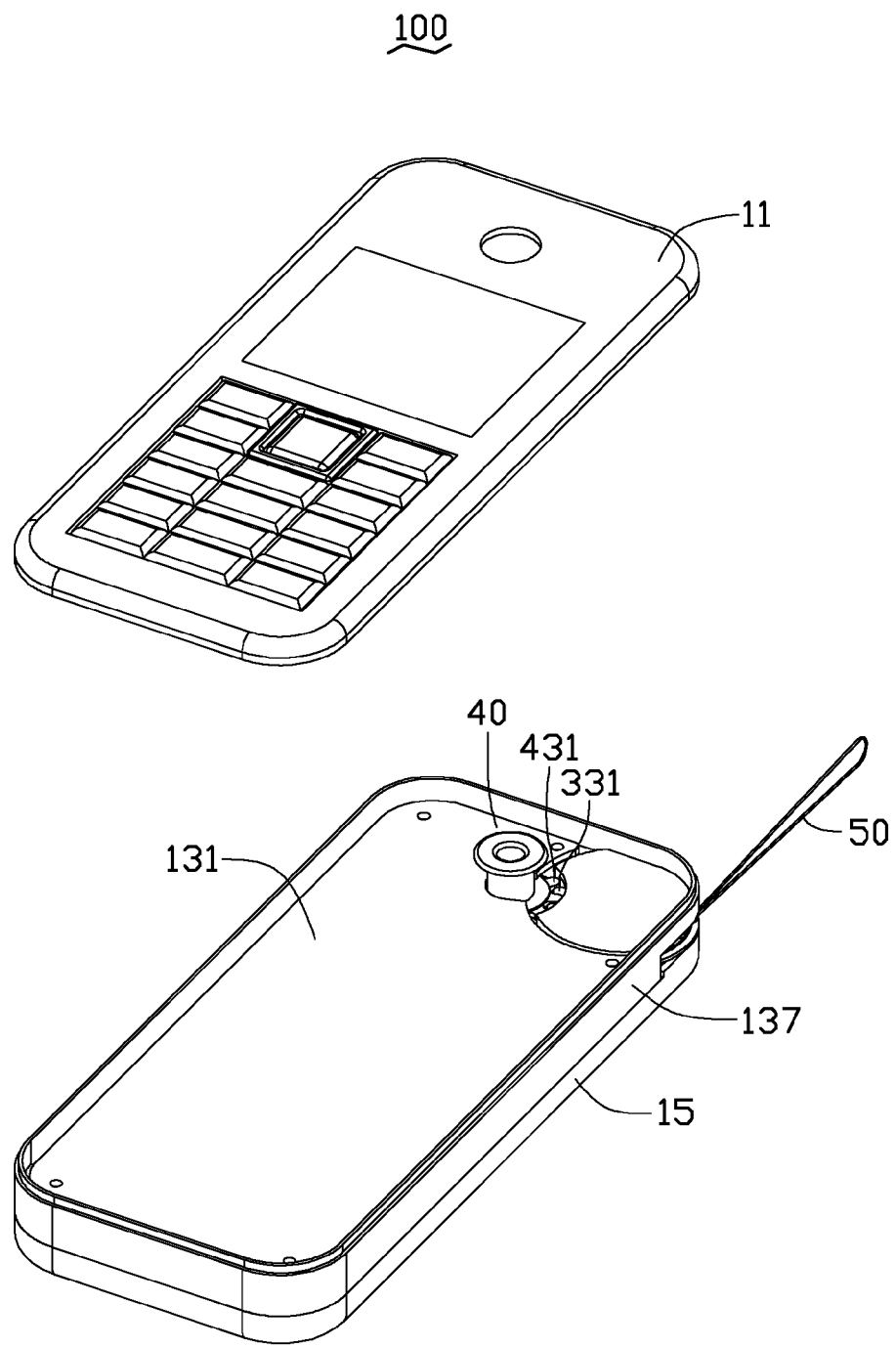
FIG. 5 is a partially assembled view of FIG. 2.
Figure 6:
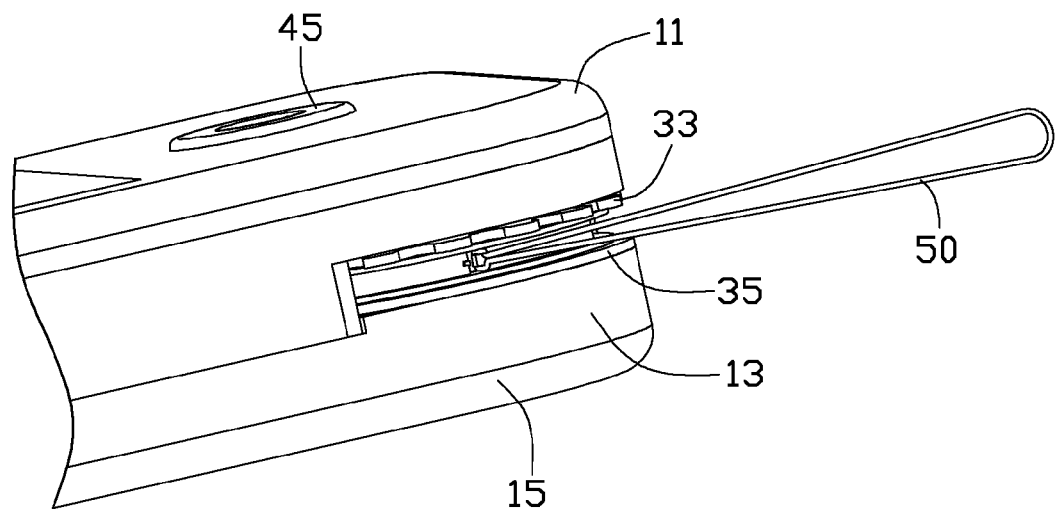
FIG. 6 is a partial view of FIG. 1 showing the accessory strap being coiled to the securing member.

Referring to FIGS. 5 and 6, during assembly of the accessory strap securing mechanism 20, firstly, the securing member 30 is disposed on the rear cover 15, with the hole 37 of the securing member 30 rotatably sleeved on the post 157 of the rear cover 15, thus, the securing member 30 is rotatable on the post 157. Then, the housing 131 is attached to the rear cover 15, and the first gear 33 of the securing member 30 is received in the groove 1360 of the assembling portion 136. One portion of the first gear 33 extends into the cutout 1369 exposing some of the teeth of the first gear 33. The flange 155 is received in the notch 1367 and defines an opening space allowing entry of the accessory strap 50. After that, the printed circuit board 137 is positioned on the second surface 135 of the housing 131. The column portion 41 is fixedly latched into the slot 1373, and the teeth 431 of the positioning member 40 engage the teeth 331 of the securing member 30. Finally, the front cover 11 is positioned over the printed circuited board 137, and the latching portion 45 deformedly extends into the assembling hole 111. Thus, the assemble process is finished.

In use, the securing member 30 is rotatable to allow the hook 317 to be exposed in the notch 1367. The accessory strap 50 is inserted into the notch 1367, and hooked on the hook 317. Accordingly, the accessory strap 50 is attached to the portable electronic device 100. When the accessory strap 50 is received in the portable electronic device, the securing member 30 is rotatable to coil the accessory strap 50 around the holding portion 31. The positioning member 40 is used for positioning the securing member 30 at any position. The distal end of the accessory strap 50 is attached to the projection 319. Thus, it is easy to operate and assemble the accessory strap 50 quickly and conveniently.

It is to be understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An accessory strap securing mechanism positioned on a portable electronic device to assemble an accessory strap thereon, the accessory strap securing mechanism comprising:
   an assembling portion formed in the portable electronic device;
   a securing member being received in the assembling portion, the securing member including a holding portion, the holding portion including a hook and a projection, the securing member being rotatable to allow the accessory strap to be coiled around the holding portion and a distal end of the accessory strap attached to the projection.

2. The accessory strap securing mechanism as claimed in claim 1, further comprising a positioning portion, wherein the securing member forms a first gear and the positioning portion forms a second gear for engaging with the first gear.

3. The accessory strap securing mechanism as claimed in claim 1, wherein the holding portion defines a gap, and the hook extends into the gap.

4. The accessory strap securing mechanism as claimed in claim 3, wherein the projection is opposite to the hook.

5. A portable electronic device comprising:
   a main body including a housing, the housing forming an assembling portion; and
   an accessory strap securing mechanism disposed on the housing to assemble an accessory strap; the accessory strap securing mechanism comprising:
      a securing member rotatably attached to the assembling portion; and
      a positioning member engaging with the securing member to position the securing member at any position.

6. The portable electronic device as claimed in claim 5, wherein the assembling portion defines a groove and a notch, the securing member forms a plurality of first teeth, and the first teeth extend into the notch.

7. The portable electronic device as claimed in claim 6, wherein the positioning member forming a plurality of second teeth engaging the first teeth.

8. The portable electronic device as claimed in claim 5, wherein the assembling portion defines a notch for allowing entry of the accessory strap.

9. The portable electronic device as claimed in claim 5, wherein the securing member includes a first gear, a holding portion, and a base portion, the holding portion forms a hook and a projection, one end of the accessory strap is attached to the hook, the securing member is rotatable to allow the accessory strap to be coiled around the holding portion and another end of the accessory strap attached to the projection.

10. A portable electronic device comprising:
    a main body comprising:
       a housing forming an assembling portion;
    a rear cover;
    an accessory strap securing mechanism disposed on the housing to assemble an accessory strap; the accessory strap securing mechanism comprising:
       a securing member rotatably attached to the rear cover, the securing member forming a hook and a projection, one end of the accessory strap being attached to the hook, the securing member being rotatable to allow the accessory strap to be coiled around the holding portion and another end of the accessory strap attached to the projection;
    a positioning member fixedly attached to the main body.

11. The portable electronic device as claimed in claim 10, wherein the rear cover forms a post, the securing member rotatably placed around the post.

12. The portable electronic device as claimed in claim 10, wherein the assembling portion defines a groove and a notch, the securing member forms a plurality of first teeth, and the first teeth extending into the notch.

13. The portable electronic device as claimed in claim 12, wherein the positioning member forms a plurality of second teeth engaging the first teeth.

14. The portable electronic device as claimed in claim 10, wherein the assembling portion defines a notch for allowing entry of the accessory strap.

* * * * *